April 8, 1930. J. T. LONG 1,753,709
CRANK SHAFT
Filed June 4, 1928
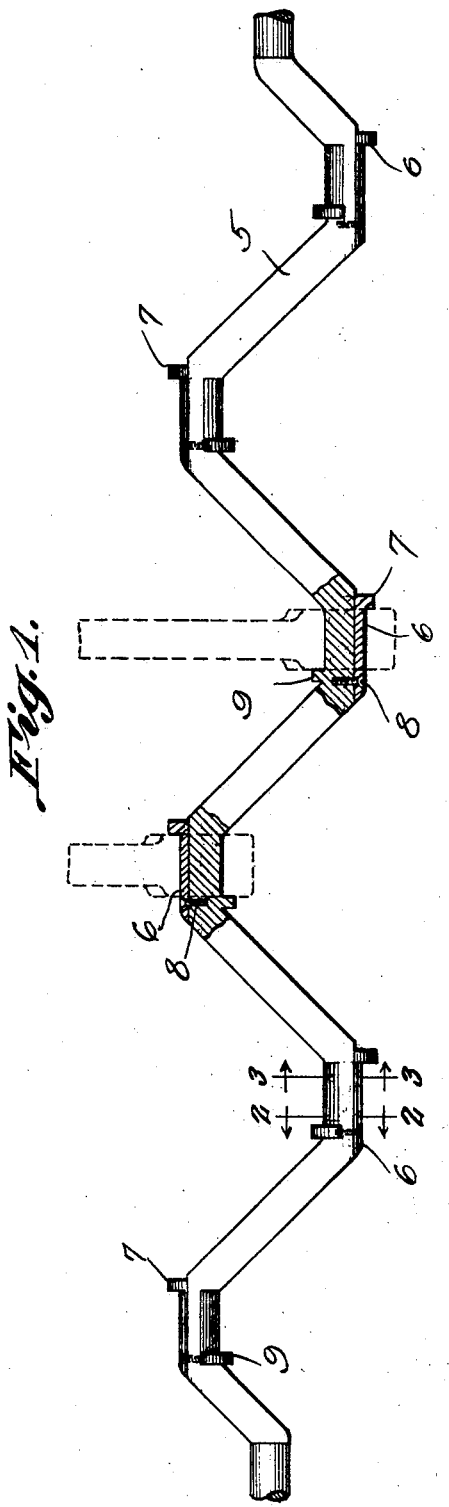
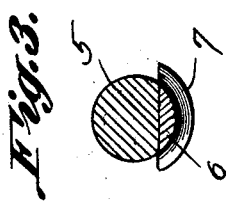
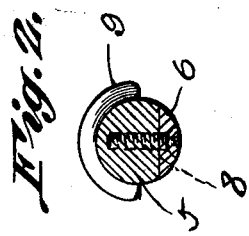
J. T. Long, Inventor
By C. A. Snow & Co.
Attorneys Patented Apr. 8, 1930

1,753,709

UNITED STATES PATENT OFFICE

JAMES THOMAS LONG, OF BOGALUSA, LOUISIANA, ASSIGNOR OF TWENTY-FIVE AND ONE-HALF PER CENT TO BASCOM D. TALLEY, OF BOGALUSA, LOUISIANA

CRANK SHAFT

Application filed June 4, 1928. Serial No. 282,611.

This invention relates to a crank shaft construction, and aims to provide a novel form of crank shaft constructed in such a way that roller or ball bearing races may be positioned thereon providing the bearings between the connecting rods and crank shaft.

An object of the invention is to provide removable sections for the cranks to fit between the cranks and bearing races to hold the bearing races in position on the cranks.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is an elevational view of a crank shaft constructed in accordance with the invention.

Figure 2 is a sectional view taken on line 2—2 of Figure 1.

Figure 3 is a sectional view taken on line 3—3 of Figure 1.

Referring to the drawing, the crank shaft is indicated generally by the reference character 5, the same being provided with cut out portions at points adjacent to the outer surfaces of the cranks, which cut out portions are designed to receive the removable crank sections 6.

These removable members 6 are formed with ribs 7 which are disposed at one of their respective ends, which ribs define stops to engage one edge of the bearing races which are preferably of the sectional type positioned thereon, to prevent lateral movement thereof.

A set screw indicated at 8 extends through each of the members 6 to secure the members in position after they have been positioned on the crank shaft. At the opposite end of each crank is an integral rib 9 that contacts with the opposite side of the bearing races associated therewith, with the result that bearing races may be held against lateral movement when they have been positioned.

From the foregoing it will be seen that due to this construction, it is possible to position bearing races on a crank shaft, to be engaged by the connecting rods of pistons, to reduce friction to the minimum.

I claim:

A crank shaft, the outer surfaces of the bearing portions of the cranks thereof being cut away throughout their entire lengths, removable bearing members, each of the removable bearing members having a flange disposed at one end thereof, each removable bearing member having an opening, a threaded member extended through each removable bearing member and positioned in the crank shaft to secure the removable bearing member in position, and each crank having a flange adjacent to one end thereof and formed on the inner surface of the crank.

In testimony that I claim the foregoing as my own, I have hereto affixed my signature.

JAMES THOMAS LONG.